July 3, 1928.
A. R. LEWELLEN
1,675,614
CIRCUIT CONTROLLING DEVICE
Original Filed June 14, 1923
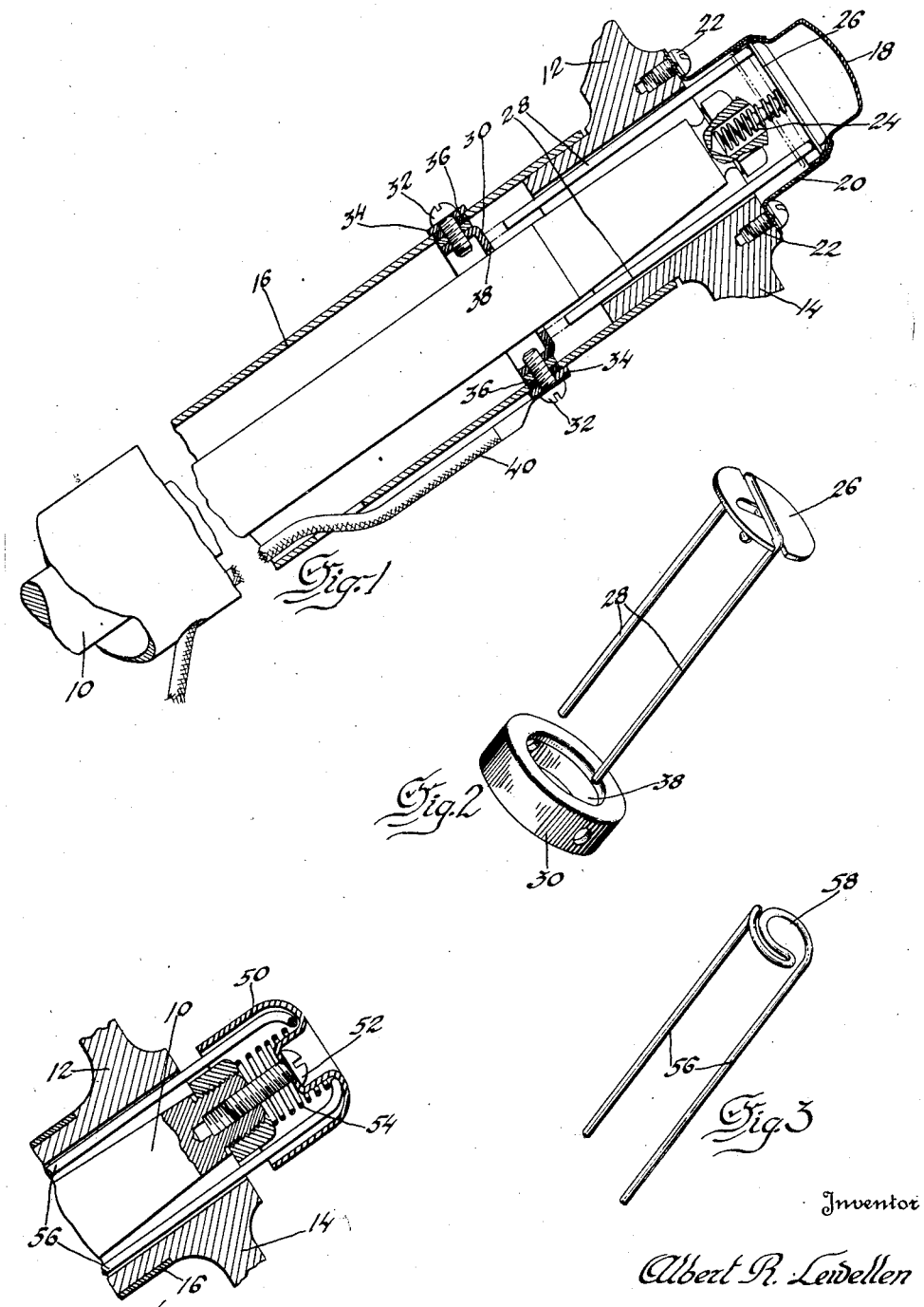
Inventor
Albert R. Lewellen
By Blackmore, Spencer & Flint.
Attorneys Patented July 3, 1928.

1,675,614

UNITED STATES PATENT OFFICE.

ALBERT R. LEWELLEN, OF DETROIT, MICHIGAN, ASSIGNOR TO GENERAL MOTORS CORPORATION, OF DETROIT, MICHIGAN, A CORPORATION OF DELAWARE.

CIRCUIT-CONTROLLING DEVICE.

Original application filed June 14, 1923, Serial No. 645,325. Divided and this application filed March 7, 1925. Serial No. 13,765.

This invention relates to circuit controlling devices and is illustrated as embodied in a horn button or switch for an automobile which is arranged to be carried by the steering wheel. An object of the invention is to provide such a switch which will not be affected by the angular positions of the steering wheel and which will have a minimum number of parts projecting above the plane of the steering wheel.

From this point of view the invention may be regarded as comprising a contact member which extends through the steering wheel, as, for example, at its hub, on opposite sides of the steering post to which the wheel is attached. This contact member is movable in a direction parallel to the axis of the steering wheel into engagement with the stationary contact member supported below the steering wheel. In order that the closing of the circuit shall not be dependent on any particular angular position of the steering wheel the stationary contact member is in annular form, and surrounds but is spaced from the steering post. In the form shown in the drawings this annular contact member is secured to but insulated from the usual sleeve which surrounds and protects the steering post.

Other objects and features of the invention, including novel combinations of parts and desirable particular constructions, will be apparent from the following description of three illustrative embodiments of my invention shown in the accompanying drawings, in which:

Figure 1 is a view partly in side elevation and partly in vertical section of a steering post assembly embodying the novel controlling device;

Figure 2 is a perspective view showing the contact parts of the device separately from the rest of the steering post assembly;

Figure 3 is a perspective view of a modified form of contact device;

Figure 4 is a vertical sectional view corresponding to the upper part of Figure 1 and showing the mounting of the contact device of Figure 3.

In the form shown in Figures 1, 2 and 3 the steering post assembly comprises a rotatable steering post 10 tapered at its upper end and fastened in the hub 12 of a steering wheel having spokes 14 carrying a rim of any suitable type. The rotatable shaft or post 10 is protected by a stationary enclosing sleeve 16.

The novel controlling device is shown as embodied in a horn button having a depressible cap 18 flared outwardly near its lower end to fit within a housing 20 secured to the hub 12 by means of tap screws 22 or in any other suitable manner, the housing serving to limit outward movement of the cap 18 under the influence of a spring 24. The spring 24 engages a disc or head 26 of such a size as to fit within the flared portion of the cap 18 to push the cap outward as far as permitted by the housing 20, and to be operated inwardly to compress the spring by depression of the cap 18. The disc 26 is notched at opposite sides to receive a U-shaped contact member 28, which has legs sliding in grooves or holes formed in the hub 12 of the steering wheel and a cross portion which is clamped by the spring 24 between the disc 26 and the flared portion of the cap 18 as will be apparent from Figure 1. The lower ends of the legs of the contact member 28 are, in their idle position, spaced slightly above an annular contact member 30 stationarily fastened to the sleeve 16 by means of screws 32. The annular contact member 30 is insulated from the sleeve 16 and from the other metal parts of the steering post assembly, there being a large insulating washer 34 serving as an enlarged head for each screw 32 and two or more smaller insulating washers 36 which insulate each screw 32 from the sleeve 16 and which serve to space the annular member 30 from the sleeve. The steering post 10 passes through a central hole 38 of such a diameter that the post does not engage the contact member. The contact member 30 is connected to the circuit of any desired electrically-controlled device, such as a signalling horn, by an insulated conductor 40 having an end portion clamped under one of the screws 32, which screw thus serves as a binding post to form an electric connection between the contact member 30 and the conductor 40.

It will be observed that in the illustrated arrangement the contact member 28 serves as a ground, as it is not insulated from the hub of the steering wheel, or from the steering post 10 or the sleeve 16, both of which are in electrical connection with the hub.

Thus depression of the cap 18 serves to bring the contact members 28 and 30 together to close the circuit from the conductor 40 to the ground provided by the metal parts of the steering post assembly.

In the modification shown in Figures 3 and 4, in lieu of the housing 20, the cap 50 which corresponds to cap 18 is centrally perforated to be slidable on a retaining screw 52 arranged axially of a spring 54 which corresponds to spring 24. In this modification the contact member 56 which corresponds to the member 28 is bent upon itself at its central portion to form a head seating against the cap 50 which takes the place of the disc 26. This head is formed in such a manner as to leave a central opening 58 through which the screw 52 and the retaining part of the housing 50 may pass. The contact member 56 is clamped against the housing 50 by the spring 54 which engages the bottom side of the head formed in this manner.

While several illustrative embodiments have been described, it is not my intention to limit its scope to those embodiments, or otherwise than by the terms of the appended claims. While especially well adapted for such use, the invention is not, in all of its aspects, necessarily limited to use with an automobile steering column, except where so specified in particular claims.

This present application is a division of my application for patent for circuit controlling devices filed on June 14, 1923, Serial No. 645,325.

I claim:

1. A controlling device comprising, in combination, a rotatable steering post, a steering wheel secured to the upper end thereof, a stationary protecting sleeve surrounding the steering post, an annular contact member secured to the protecting sleeve of its inner side and below its upper end, and which member surrounds and is spaced from the steering post, and a circuit closing device including a cooperating contact member eccentrically mounted in the steering wheel and displaceable in a direction parallel to the axis of the steering post to cause its lower end to engage directly with different parts of the annular contact member.

2. A controlling device comprising, in combination, a steering post, a steering wheel secured to the upper end of the steering post, a protecting sleeve surrounding the steering post, an annular contact member carried by the sleeve, and a circuit closing device including a member which is carried by the steering wheel and which has a pair of legs straddling the upper end of the steering post and which is axially movable to bring the legs into engagement with different parts of the annular contact member.

3. A controlling device comprising, in combination, a steering wheel, a contact member stationarily supported below the steering wheel, and a second contact member mounted in and rotatable with the steering wheel and which has a pair of legs extending through the steering wheel on opposite sides of its axis and which is axially movable to engage different parts of the stationary contact member.

4. A controlling device comprising, in combination, a steering wheel, an annular contact member stationarily supported below the steering wheel, a contact member supported by and rotatable with the steering wheel and which has legs extending through the steering wheel on opposite sides of its axis and which are connected by a cross portion, and a depressible cap engaging the cross portion for forcing the legs into engagement with different parts of the annular contact member to close the circuit.

5. A controlling device comprising, in combination, a steering wheel, an annular contact member supported below the steering wheel, a contact member carried by and rotatable with the steering wheel and which has a pair of legs passing through the steering wheel on opposite sides of its axis and a cross portion connecting the upper ends of the legs, a cap engaging the cross portion and depressible to force the legs against different parts of the annular contact member to close the circuit, and a spring engaging the cap and urging the cap and contact member axially of the steering wheel in a direction to open the circuit.

6. A controlling device comprising, in combination, a steering wheel, an annular contact member supported below the steering wheel, a movable contact member carried by and rotatable with the steering wheel and which has a pair of legs passing through the steering wheel on opposite sides of its axis which are connected by a cross portion at their upper ends, a cap engaging the cross portion of said contact member and depressible to force the legs against the annular contact member, a disc engaging the cross portion and the cap, and a spring acting on the disc to urge the contact member and the cap in a direction to open the circuit.

7. A circuit closing switch comprising, in combination, a stationarily supported annular contact member, a movable U-shaped contact member having its legs arranged eccentrically and upon opposite sides of, and in the same plane as the axis of the annular member and which is rotatable about said axis, means for moving said movable member in a direction parallel to the axis to force the free ends of the legs against the annular contact member regardless of their relative angular positions, and a spring for urging the U-shaped member in the opposite direction to open the circuit.